US011486706B2

(12) United States Patent
Wu et al.

(10) Patent No.: US 11,486,706 B2
(45) Date of Patent: Nov. 1, 2022

(54) KERR EFFECT REDUCTION IN SBS LASER GYROSCOPE

(71) Applicant: Honeywell International Inc., Morris Plains, NJ (US)

(72) Inventors: Jianfeng Wu, Tucson, AZ (US); Matthew Wade Puckett, Phoenix, AZ (US); Karl D. Nelson, Plymouth, MN (US)

(73) Assignee: Honeywell International Inc., Charlotte, NC (US)

(*) Notice: Subject to any disclaimer, the term of this patent is extended or adjusted under 35 U.S.C. 154(b) by 274 days.

(21) Appl. No.: 16/858,272

(22) Filed: Apr. 24, 2020

(65) Prior Publication Data

US 2021/0333106 A1    Oct. 28, 2021

(51) Int. Cl.
*G01C 19/66* (2006.01)
*H01S 3/30* (2006.01)
*H01S 3/067* (2006.01)

(52) U.S. Cl.
CPC .......... *G01C 19/661* (2013.01); *H01S 3/0675* (2013.01); *H01S 3/302* (2013.01)

(58) Field of Classification Search
CPC .... G01C 19/66; G01C 19/661; G01C 19/721; G01C 19/727; H01S 3/0675; H01S 3/302
See application file for complete search history.

(56) References Cited

U.S. PATENT DOCUMENTS

| 4,396,290 A * | 8/1983 | Morris ............. H01S 3/083 356/461 |
| 5,351,252 A | 9/1994 | Toyama et al. |
| 5,537,671 A | 7/1996 | Toyama et al. |
| 8,830,478 B2 | 9/2014 | Wu et al. |
| 9,083,147 B2 | 7/2015 | Westbrook et al. |
| 2017/0067743 A1 | 3/2017 | Salit et al. |

(Continued)

FOREIGN PATENT DOCUMENTS

WO    WO-2010077527 A1 *  7/2010  ............. B82Y 20/00

OTHER PUBLICATIONS

Loh et al., "Ultra-Narrow Linewidth Brillouin Lasers with Nanokelvin Thermometry", at least as early as Aug. 27, 2018, pp. 1 through 13, Optical Society of America.
Penninckx et al., "Multiple-frequency injection-seeded nansecond pulsed laser without parasitic intensity modulation", Optics Letters, Jul. 15, 2016, pp. 1 through 3237-3240, vol. 41, No. 14, Optical Society of America.

(Continued)

*Primary Examiner* — Michael A Lyons
(74) *Attorney, Agent, or Firm* — Fogg & Powers LLC

(57) ABSTRACT

A method for reducing or eliminating bias instability in a SBS laser gyroscope comprises introducing a first pump signal propagating in a CW direction, and a second pump signal propagating in a CCW direction in a resonator; generating a CCW first-order SBS signal and a CW first-order SBS signal in the resonator; increasing a power level of the first pump signal above a threshold level such that the CW first-order SBS signal generates a CCW second-order SBS signal; and increasing a power level of the second pump signal above the threshold level such that the CCW first-order SBS signal generates a CW second-order SBS signal. Above the threshold level, an intensity fluctuation of the first-order SBS signals disappear and their DC power are clamped at substantially the same power level. A Kerr effect bias instability of the SBS laser gyroscope is reduced or eliminated by the clamped first-order SBS signals.

16 Claims, 5 Drawing Sheets

(56) References Cited

U.S. PATENT DOCUMENTS

2018/0358772 A1\* 12/2018 Puckett .............. H01S 3/06791
2019/0017824 A1\* 1/2019 Qiu ..................... G01C 19/667
2019/0341739 A1 11/2019 Loh et al.

OTHER PUBLICATIONS

Smith, "Studies of Stimulated Brillouin Scattering in Optical Fibers and Applications", Department of Electrical Engineering and Computer Science in Partial Fulfillment of the Requirements for the Degree of Doctor of Science, Sep. 29, 1993, pp. 1 through 172, Massachusetts Institute of Technology.

Takiguchi et al., "Method to Reduce the Optical Kerr-Effect-Induced Bias in an Optical Passive Ring-Resonator Gyro", IEEE Photonics Technology Letters, Feb. 1992, pp. 203 through 206, vol. 4, No. 2, IEEE.

Zhang et al., "Mode decoupling in solid state ring laser based on stimulated Raman effect in polar crystals", Chinese Physical Society 024205, 2011, pp. 1 through 5, vol. 20, No. 2, IOP Publishing Ltd.

European Patent Office, "Extended European Search Report from EP Application No. 21157733.3", from Foreign Counterpart to U.S. Appl. No. 16/858,272, filed Jan. 31, 2022, pp. 1 through 13, Published: EP.

Lai, et al., "A Chip-based Brillouin Laser Gyroscope", 2020 IEEE/ION Position, Location and Navigation Symposium (PLANS), IEEE, Apr. 20, 20, pp. 1 through 8, (c) 2020 IEEE.

Li et al., "Microresonator Billouin Gyroscope", Optica, vol. 4, No. 3, Mar. 7, 2017, pp. 346-348, Document ID 280805, Retrieved from the Internet: URL: https://www.osapublishing.org/viewmedia.cfm?URI=optica-4-3-346>, (c) 2017 Optical Society of America.

Nicati, et al., "Frequency Stability of a Brillouin Fiber Ring Laser", Journal of Lightwave Technology, vol. 13, No. 7, Jul. 1995, pp. 1445 through 1451, (c) 1995 IEEE.

\* cited by examiner

KERR EFFECT REDUCTION IN SBS LASER GYROSCOPE

STATEMENT REGARDING FEDERALLY SPONSORED RESEARCH OR DEVELOPMENT

This invention was made with Government support under Contract No. N6600116C4017 awarded by SPAWAR (now NIWC). The Government has certain rights in the invention.

BACKGROUND

The stimulated Brillouin scattering (SBS) laser gyroscope is a promising technology for next generation gyroscopes due to its simplicity and potential for miniaturization. The SBS lasers in such gyroscopes have very low phase noise due to short phonon lifetime. As in all optical gyroscopes based on waveguides, the SBS laser gyroscope has bias errors due to the gyroscope Kerr effect.

The Kerr effect is caused by the difference between cross-phase modulation and self-phase modulation. These two different phase modulations generate different refractive index changes that cause a bias in rotation measurements. The variation of such differences generates the bias instability, which is one of the fundamental bias errors in waveguide based gyroscopes.

SUMMARY

A method for reducing or eliminating bias instability in a stimulated Brillouin scattering (SBS) laser gyroscope is provided. The method comprises introducing a first pump signal propagating in a clockwise (CW) direction in an optical resonator of the SBS laser gyroscope; introducing a second pump signal propagating in a counterclockwise (CCW) direction in the optical resonator; generating a CCW first-order SBS signal in the optical resonator that propagates in the CCW direction; generating a CW first-order SBS signal in the optical resonator that propagates in the CW direction; increasing a power level of the first pump signal to above a threshold level such that the CW first-order SBS signal generates a CCW second-order SBS signal in the optical resonator; and increasing a power level of the second pump signal to above the threshold level such that the CCW first-order SBS signal generates a CW second-order SBS signal in the optical resonator. Above the threshold level, an intensity fluctuation of the first-order SBS signals disappear and their direct current (DC) power are clamped at substantially the same power level. A Kerr effect bias instability of the SBS laser gyroscope is reduced or eliminated by the clamped first-order SBS signals.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
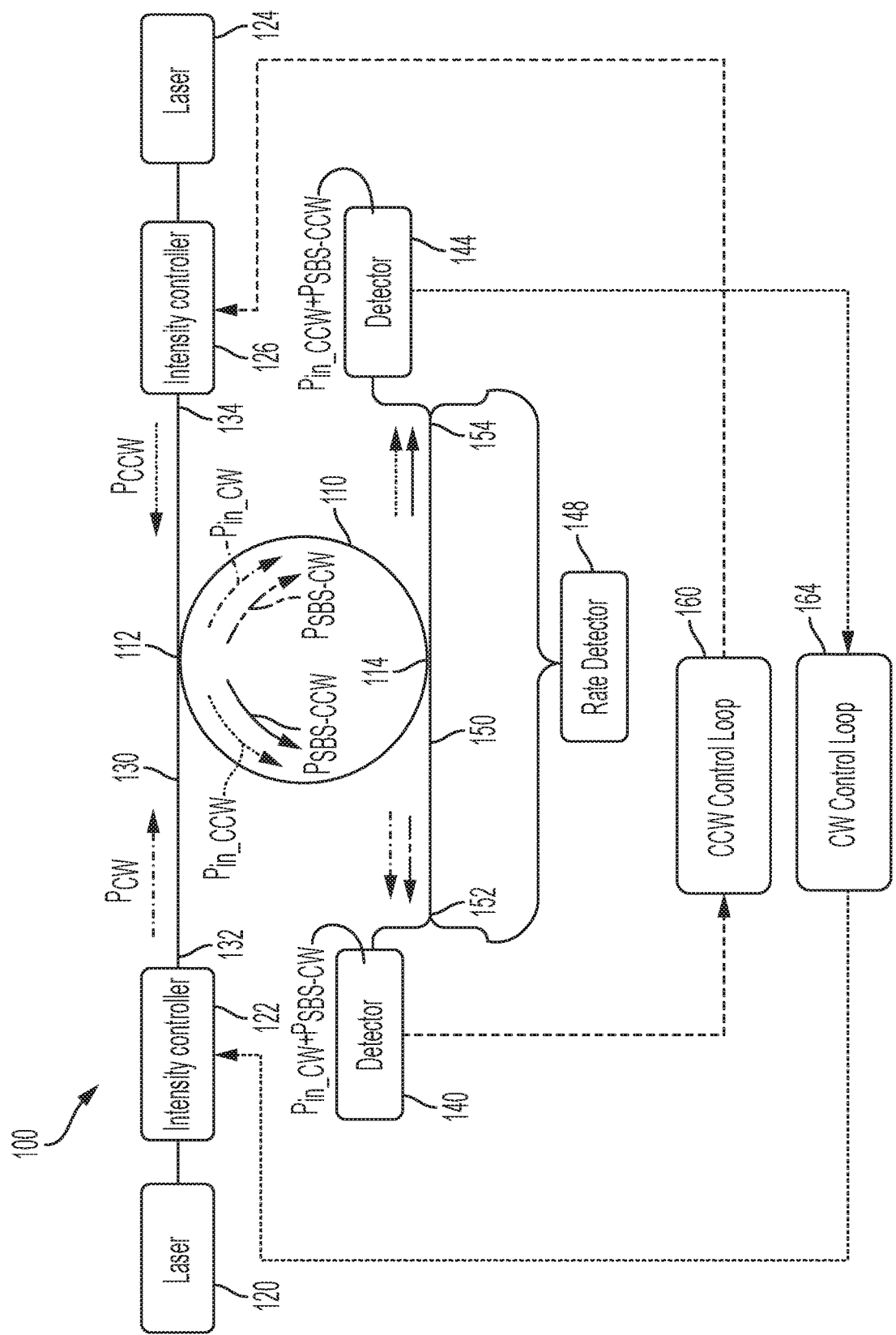
FIG. 1 is a schematic diagram of a stimulated Brillouin scattering (SBS) laser gyroscope, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method for Kerr effect reduction in stimulated Brillouin scattering (SBS) laser gyroscopes is described herein. The Kerr effect is one of the fundamental bias errors that need to be reduced to achieve navigation grade performance for SBS laser gyroscopes. The bias instability due to the Kerr effect mainly depends on the intracavity power difference between clockwise (CW) and counterclockwise (CCW) SBS lasers that are used for rate detection in SBS laser gyroscopes. The present method is based on a laser pump power clamping technique that eliminates such bias errors.

In general, the present approach provides for increasing the laser pump power so that a first SBS power (both CW and CCW) reaches a threshold and starts to generate a second SBS power. A first SBS laser becomes the pump laser for the second SBS power, and the first SBS power is clamped at a level to satisfy the steady state condition, which is that the gain should be equal to cavity loss. Because the cavity loss is reciprocal, the gain of the second SBS power should be same for both the CW and CCW directions. Therefore, the first SBS power in the CW and CCW directions is the same. This reduces or eliminates the Kerr effect in the SBS laser gyroscope.

In resonator-based gyroscopes such as SBS laser gyroscopes, one fundamental limit is the Kerr effect due to the unbalance of the CW and CCW power. In a steady state laser, gain is equal to loss, and the intracavity pump is clamped at the level that satisfies the lasing threshold. The wave propagation equation and Kerr effect can be described by the following expressions:

$$-\frac{1}{E_{SBS}} * \frac{dE_{SBS}}{dz} = \text{Real}\left(-\frac{\alpha}{2} + \frac{1}{2} \cdot \frac{g_B * I_P}{1 - i*(2 \cdot \Delta v_{P,S}/\Delta v_B)}\right) = 0$$

$$I_P \sim (\alpha, \Delta v_{P,S})$$

$$\Delta n_{CW} = n_2 * (\Delta I_{CW} + 2*\Delta I_{CCW})$$

$$\Delta n_{CCW} = n_2 * (2*\Delta I_{CW} + \Delta I_{CCW})$$

where $I_p$ is the intracavity pump intensity that is clamped at threshold, $E_{SBS}$ is the electric field of SBS, $I_{CW}$ is intensity of light propagating in the CW direction, $I_{CCW}$ is the intensity of light propagating in the CCW direction, $n_2$ is the nonlinear refractive index, $\alpha$ is the cavity loss, $g_B$ is the SBS gain coefficient, $\Delta v_{P,S}$ is the difference between gain peak and SBS laser peak, and $\Delta v_B$ is the bandwidth of the Brillouin gain.

Above a second-order SBS threshold, the first order SBS becomes the pump for $2^{nd}$ order SBS generation, and the $1^{st}$ order SBS intensity is clamped at $I_p$. Since the cavity loss ($\alpha$) is reciprocal, the CW and CCW threshold are the same. Therefore, both CW and CCW $1^{st}$ order SBS have the same intracavity intensity:

$$I_{1st\,SBS\_CW} = I_{1st\,SBS\,CCW}$$

One method for reducing or eliminating bias instability in a SBS laser gyroscope comprises modulating the intensities of a CW pump signal and a CCW pump signal, such that a CCW first-order SBS signal and a CW first-order SBS signal are generated in an optical resonator of the gyroscope. The method increases a power level of the CW pump signal to above a threshold level such that the CCW first-order SBS signal generates a CW second-order SBS signal in the resonator. The method also increases a power level of the CCW pump signal to above the threshold level such that the CW first-order SBS signal generates a CCW second-order SBS signal in the resonator. At above the threshold level, the first-order SBS signals are clamped at substantially the same power level.

The present methods provides the benefit of stabilizing laser power in the resonator of a SBS laser gyroscope. The method increases the pump power sufficiently such that the first-order SBS power becomes the pump that generates the second-order SBS power. The first-order SBS power is clamped and remains constant in both the CW and CCW directions. The method allows the CW power to be equal to the CCW power in the gyroscope.

The present approach allows a reciprocal gyroscope to be operated with the same CW and CCW power, such that Kerr biases are eliminated. The constant power is ensured by operating the gyroscope above the second-order SBS threshold, thereby reducing or eliminating bias instability due to the Kerr effect.

Further details of various embodiments are described hereafter with reference to the drawings.

FIG. 1 schematically illustrates a general architecture layout of a SBS laser gyroscope 100, according to one embodiment. The SBS laser gyroscope 100 includes an optical resonator such as a ring resonator 110, which is in optical communication with a first laser device such as a first pump laser 120, and a second laser device such as a second pump laser 124, through an optical path such as an input bus waveguide 130. In one embodiment, ring resonator 110 can be a fiber optic coil wound around a core and about an axis around which rotation is sensed. In another embodiment, ring resonator 110 can be formed on an optical chip using waveguides.

A first intensity controller 122 is optically coupled between an output of first pump laser 120 and a first end 132 of input bus waveguide 130. A second intensity controller 126 is optically coupled between an output of second pump laser 124 and an opposite second end 134 of input bus waveguide 130.

The input bus waveguide 130 is optically coupled to ring resonator 110 at an input coupling region 112 on a first side of ring resonator 110. An output bus waveguide 150 is optically coupled to ring resonator 110 at an output coupling region 114.

A first optical detector 140 is in optical communication with ring resonator 110 through a CW transmission port 152 of output bus waveguide 150. A second optical detector 144 is in optical communication with ring resonator 110 through a CCW transmission port 154 of output bus waveguide 150. A rate detector 148 is in optical communication with ring resonator 110 through both CW and CCW transmission ports 152, 154.

A first control loop device such as a CCW control loop 160 is operatively coupled between an output of first optical detector 140 and an input of second intensity controller 126. A second control loop device such as a CW control loop 164 is operatively coupled between an output of second optical detector 144 and an input of first intensity controller 122.

During operation, first laser pump 120 emits a first optical signal that propagates in a first direction to first intensity controller 122, which processes the first optical signal to produce a first intensity modulated (IM) pump signal ($P_{CW}$). The first IM pump signal is modulated at frequency of f1 and is sent to ring resonator 110 through input bus waveguide 130. The first IM pump signal is coupled into ring resonator 110 at input coupling region 112 and propagates in a CW direction ($P_{in\_CW}$) in ring resonator 110. A CCW first-order SBS signal ($P_{SBS\text{-}CCW}$) is generated in optical resonator 110 and counter-propagates in the CCW direction. The intensity of the CCW first-order SBS signal is measured by optical detector 144. Without $2^{nd}$ order SBS, the intensity of the CCW first-order SBS signal is also modulated at the frequency of f1, because the input CW pump, the first IM pump, is modulated at the frequency of f1.

The second laser pump 124 emits a second optical signal that propagates in a second opposite direction to second intensity controller 126, which processes the second optical signal to produce a second IM pump signal ($P_{CCW}$). The second IM pump signal is modulated at frequency of f2 and is sent to ring resonator 110 through input bus waveguide 130. The second IM pump signal is coupled into ring resonator 110 at input coupling region 112 and propagates in a CCW direction ($P_{in\_CCW}$) in ring resonator 110. A CW first-order SBS signal ($P_{SBS\text{-}CW}$) is generated in optical resonator 110 and counter-propagates in the CW direction. The intensity of the CW first-order SBS signal is measured by optical detector 140. Without $2^{nd}$ order SBS, the intensity of the CW first-order SBS signal is also modulated at the frequency of f2, because the input CCW pump, the second IM pump, is modulated at the frequency of f2.

The first optical detector 140 is operative to receive the first transmitted IM pump signal ($P_{in\_CW}$) and CW first-order SBS signal ($P_{SBS\text{-}CW}$ modulated at f2), which are coupled out of ring resonator 110 at output coupling region 114 and into output bus waveguide 150. The second optical detector 144 is operative to receives the second transmitted IM pump signal ($P_{in\_CCW}$) and the CCW first-order SBS signal ($P_{SBS\text{-}CCW}$ modulated at f1), which are coupled out of ring resonator 110 at output coupling region 114 and into output bus waveguide 150. The signals coupled out of ring resonator 110 are also sent to rate detector 148 via output bus waveguide 150 for further processing to determine rotation rates.

The CCW control loop 160 is configured to receive an electrical signal at f2 from first optical detector 140. The CCW control loop 160 is operative to minimize the electrical signal at f2 by adjusting intensity controller 126 to control the direct current (DC) pump power in the CCW direction. The CW control loop 164 is configured to receive an electrical signal at f1 from second optical detector 144. The CW control loop 164 is operative to minimize the electrical signal at f1 by adjusting intensity controller 122 to control the DC pump power in the CW direction.

Figure 2:
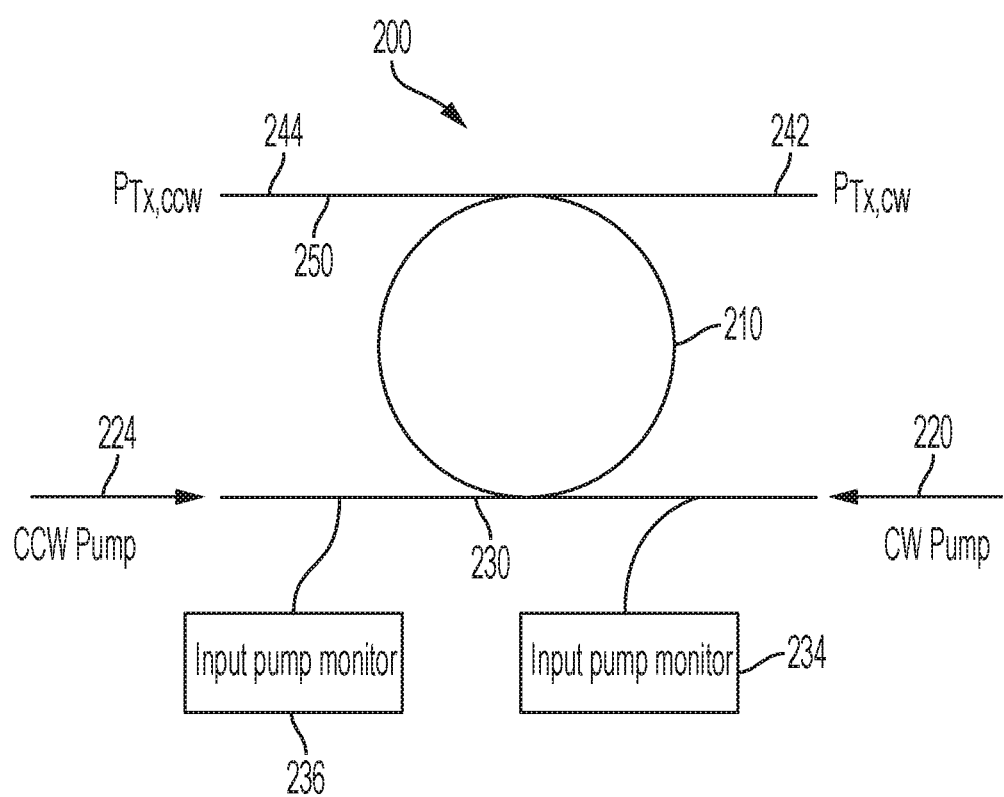
FIG. 2 is a schematic diagram of a portion of a SBS laser gyroscope, according to an exemplary implementation.

In another implementation without a feedback control loop, the pump is preset at a level that can generate $2^{nd}$ order SBS in the cavity. FIG. 2 is a schematic diagram illustrating a portion of a SBS laser gyroscope 200, according to this implementation.

The SBS laser gyroscope 200 includes a ring resonator 210, which is in configured to receive a CW pump signal 220 and a CCW pump signal 224, from respective CW and CCW pump lasers, through an input bus waveguide 230. A first input pump monitor 234 is operative to monitor the intensity of CW pump signal 220, and a second input pump monitor 236 is operative to monitor the intensity of CCW pump signal 224. The ring resonator 210 is in optical communication with a CW transmission port 242 and a CCW transmission port 244 through an output bus waveguide 250.

In a method for reducing or eliminating bias instability in SBS laser gyroscope 200, the method increases a power level of the CW pump signal 220 to above a threshold level such that a CCW first-order SBS signal generates a CW second-order SBS signal in ring resonator 210. The second-order SBS pump threshold is usually about four times the first-order SBS pump threshold. The method also increases a power level of CCW pump signal 224 to above the threshold level such that a CW first-order SBS signal generates a CCW second-order SBS signal in ring resonator 210. Above the second-order SBS threshold level, the first-order SBS signals are clamped at substantially the same power level. The input pump monitors 234 and 236 provide a feedback to the pump power to maintain the power level of the second-order SBS signals as needed. A Kerr effect bias instability of SBS laser gyroscope 200 is reduced or eliminated by the generated second-order SBS signals and the clamped first-order SBS signals.

In the SBS laser gyroscope 200 (FIG. 2), the pump threshold for $2^{nd}$ order SBS generation can be exactly four times the pump threshold ($P_{Threshold}$) for $1^{st}$ order SBS generation. In the implementation of FIG. 2, the pump threshold is measured for $1^{st}$ order SBS generation, and both CW and CCW pump power can be set to a level that is slightly higher than four times (4×) of the first pump threshold (such as 4.2×). In this case, both CW and CCW $1^{st}$ order SBS are clamped at an intracavity pump threshold.

Figure 3:
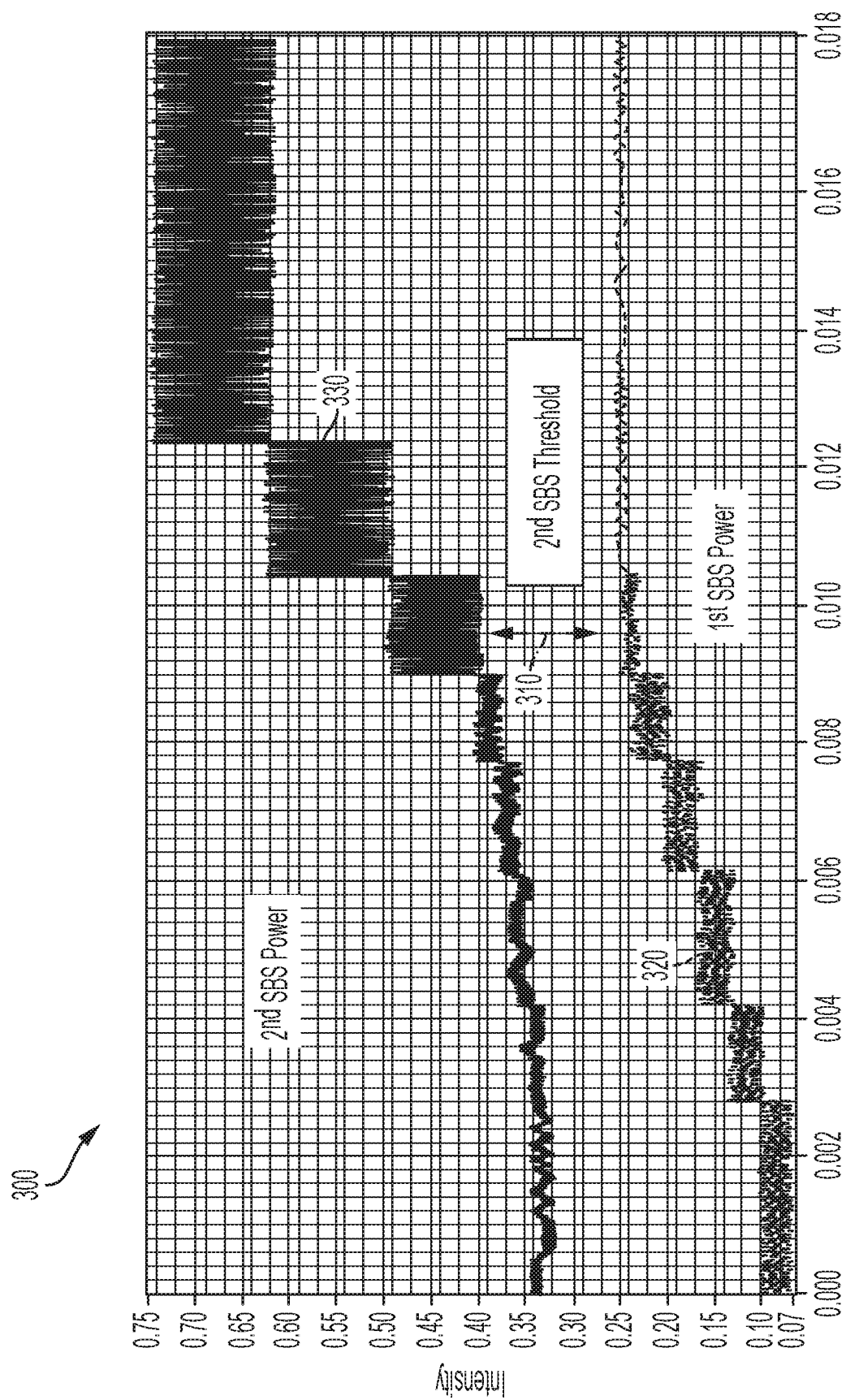
FIG. 3 is a time plot representing a method for reducing or eliminating a Kerr effect bias instability in a SBS laser gyroscope.

FIG. 3 is a time plot 300 illustrating the method for reducing or eliminating the Kerr effect bias instability in the SBS laser gyroscope. When the pump signals are intensity modulated, first-order SBS signals are generated in the ring resonator with a same modulation period. When the pump signals are increased in intensity to above a second-order SBS threshold 310, the first-order SBS signals are clamped at a given power level and generate second-order SBS signals in the ring resonator. The second-order SBS signals can then be intensity modulated at a second-order SBS power over a second time period.

For example, as shown in FIG. 3, a plot curve 320 represents the intensity of the first-order SBS signals, which becomes stable at about 0.010 seconds and gets clamped at about 0.25 without intensity modulation. Even if the pump power is increased, the first-order SBS power does not change since it is clamped as the pump for second-order SBS generation. Above this point, the intensity of the second-order SBS signals, represented by a plot curve 330, increases with a large amplitude modulation.

The foregoing method is described in further detail as follows. To stabilize the SBS power, the launching pump power is defined as $P_P^{in}$. To stabilize the input directly: $P_P^{in}$; to stabilize the SBS power:

$$\sqrt{\frac{P_P^{in}}{P_{th}}}.$$

While the SBS power is generated, the intracavity pump power is clamped at its threshold $P_{th}$:

$$P_{th} = -\frac{Loss}{g_B * L\left(1 + \left(\frac{2\Delta v_{GP-SBS}}{\Delta v_B}\right)^2\right)}$$

where $P_{th,CW} = P_{th,CCW} = P_{th}$ due to the reciprocal loss in the cavity.

The intracavity SBS power is defined by the expression:

$$P_{SBS} = \left(-\frac{Loss}{g_B * L\left(1 + \left(\frac{2\Delta v_{GP-SBS}}{\Delta v_B}\right)^2\right)}\right) * \left(\sqrt{\frac{P_P^{in}}{P_{th}}} - 1\right)$$

At the CW transmission port, the transmitted power ($P_{TX,CW}$) is described by:

$$P_{Tx,cw} = (P_{th,cw} + P_{SBS,cw}) * (1 - t^2) =$$

$$\left(P_{th} + P_{th} * \left(\sqrt{\frac{P_{P,CCW}^{in}}{P_{th}}} - 1\right)\right) * (1 - t^2) = \sqrt{P_{th} * P_{P,CCW}^{in}} * (1 - t^2)$$

where t is the transmission of the output coupler. It is clear that the transmission port is directly related to the launching power. The transmission port is a good place to monitor the launched pump power fluctuation.

Figure 4:
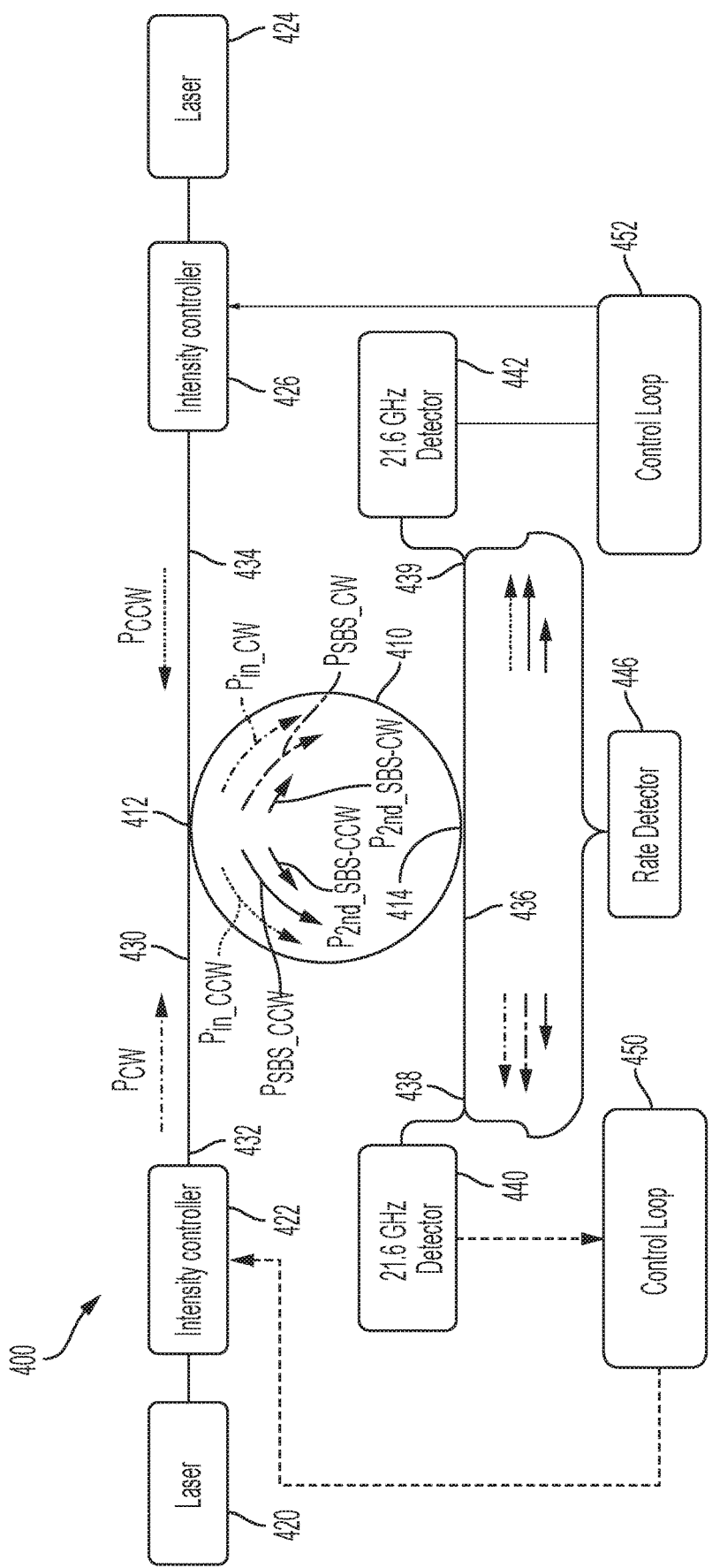
FIG. 4 is a schematic diagram of a SBS laser gyroscope, according to another embodiment.

FIG. 4 schematically illustrates a SBS laser gyroscope 400, according to another embodiment. The SBS laser gyroscope 400 includes a ring resonator 410, which is in optical communication with a first pump laser 420 via an input bus waveguide 430. A first intensity controller 422 is optically coupled between an output of first pump laser 420 and a first end 432 of input bus waveguide 430.

The SBS laser gyroscope 400 also includes a second pump laser 424, which is in optical communication with ring resonator 410 through input bus waveguide 430. A second intensity controller 426 is optically coupled between an output of second pump laser 424 and an opposite second end 434 of input bus waveguide 430.

The input bus waveguide 430 is optically coupled to ring resonator 410 at an input coupling region 412 on a first side of ring resonator 410. An output bus waveguide 436 is optically coupled to ring resonator 410 at an output coupling region 414 on an opposing second side of ring resonator 410. A first high frequency optical detector 440, such as a 21.6 GHz detector, is in optical communication with ring resonator 410 through a CW transmission port 438 of output bus waveguide 436. A first intensity control loop 450 is operatively coupled between an output of first optical detector 440 and an input of first intensity controller 422.

A second high frequency optical detector 442, such as a 21.6 GHz detector, is in optical communication with ring resonator 410 through a CCW transmission port 439 of output bus waveguide 436. A second intensity control loop 452 is operatively coupled between an output of the second optical detector 442 and an input of second intensity controller 426. A rate detector 446 is in optical communication with ring resonator 410 through both CW and CCW transmission ports 438, 439.

The SBS laser gyroscope 400 is particularly suited for a method of locking the pump laser at a level when 21.6 GHz is detected. During operation, first laser pump 420 emits a first optical signal that propagates to first intensity controller 422, which processes the first optical signal to produce a first pump signal ($P_{CW}$) that is sent to ring resonator 410 through input bus waveguide 430. The first pump signal is coupled into ring resonator 410 at input coupling region 412 and propagates in a CW direction ($P_{in\_CW}$) in ring resonator 410.

A CCW first-order SBS signal ($P_{SBS-CCW}$) is generated in optical resonator 410 and counter-propagates in the CCW direction.

A second pump signal ($P_{CCW}$) that is sent from second pump laser 424 to ring resonator 410 through input bus waveguide 430. The second pump signal is coupled into ring resonator 410 at input coupling region 412 and propagates in a CCW direction ($P_{in\_CCW}$) in ring resonator 410. A CW first-order SBS signal ($P_{SBS-CW}$) is generated in optical resonator 410 and counter-propagates in the CW direction.

The optical detector 440 receives the first pump signal ($P_{in\_CW}$), the CW first-order SBS signal ($P_{SBS-CW}$), and the CW $2^{nd}$ order SBS signal ($P_{2nd-SBS-CW}$), which are coupled out of ring resonator 410 at output coupling region 414 and into output bus waveguide 436. The first intensity control loop 450 is configured to receive a first electrical signal from optical detector 440. The optical detector 440 is used to monitor the beat frequency between first pump signal ($P_{in\_CW}$) and CW $2^{nd}$ order SBS signal ($P_{2nd-SBS-CW}$). The beat frequency is usually at 21.6 GHz for a silica based waveguide. The first intensity control loop 450 is operative to minimize the first electrical signal by adjusting first intensity controller 422 to control the DC pump power in the CW direction.

The optical detector 442 receives the second pump signal ($P_{in\_CCW}$), the CCW first-order SBS signal ($P_{SBS-CCW}$), and the CCW $2^{nd}$ order SBS signal ($P_{2nd-SBS-CCW}$), which are coupled out of ring resonator 410 at output coupling region 414 and into output bus waveguide 436. The second intensity control loop 452 is configured to receive a second electrical signal from second optical detector 442. The optical detector 442 is used to monitor the beat frequency between first pump signal ($P_{in\_CCW}$) and CCW $2^{nd}$ order SBS signal ($P_{2nd-SBS-CCW}$). The beat frequency is usually at 21.6 GHz for a silica based waveguide. The second intensity control loop 452 is operative to minimize the second electrical signal by adjusting second intensity controller 426 to control the DC pump power in the CCW direction.

The power of the pump lasers are increased to above a second-order SBS threshold to produce a CW second-order SBS signal ($P_{2nd\_SBS-CW}$) and a CCW second-order SBS signal ($P_{2nd\_SBS-CCW}$) that counter-propagate in resonator 410. The first-order SBS power signals are clamped, and the second-order SBS power signals are intensity modulated.

Figure 5:
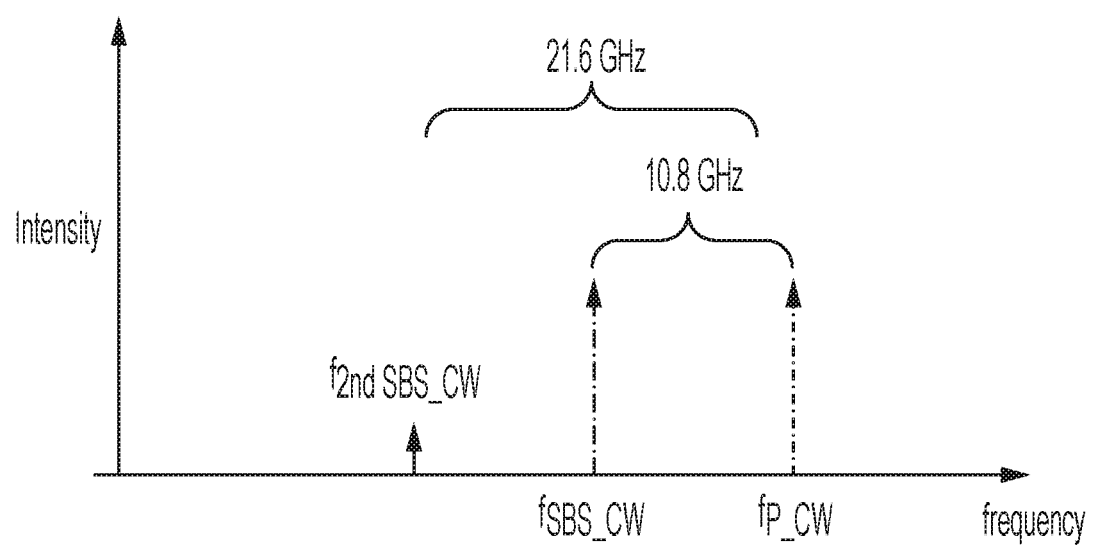
FIG. 5 is a graph representing the operation of the SBS laser gyroscope of FIG. 4.

FIG. 5 is a graph representing the operation of SBS laser gyroscope 400. The graph of FIG. 5 depicts the frequency (f) of the light at the CW transmission port with respect to intensity. As shown, the frequency span between the first pump signal ($f_{P\_CW}$) and the CW first-order SBS signal ($f_{SBS\_CW}$) is 10.8 GHz. The frequency span between the first pump signal and the CW second-order SBS signal ($f_{2nd\_SBS\_CW}$) is 21.6 GHz. The intensity control loops are used to keep the 21.6 GHz signal at a fixed small value.

Example Embodiments

Example 1 includes a method for reducing or eliminating bias instability in a stimulated Brillouin scattering (SBS) laser gyroscope, the method comprising: introducing a first pump signal propagating in a clockwise (CW) direction in an optical resonator of the SBS laser gyroscope; introducing a second pump signal propagating in a counterclockwise (CCW) direction in the optical resonator; generating a CCW first-order SBS signal in the optical resonator that propagates in the CCW direction; generating a CW first-order SBS signal in the optical resonator that propagates in the CW direction; increasing a power level of the first pump signal to above a threshold level such that the CW first-order SBS signal generates a CCW second-order SBS signal in the optical resonator; and increasing a power level of the second pump signal to above the threshold level such that the CCW first-order SBS signal generates a CW second-order SBS signal in the optical resonator; wherein above the threshold level, an intensity fluctuation of the first-order SBS signals disappear and their direct current (DC) power are clamped at substantially the same power level; and wherein a Kerr effect bias instability of the SBS laser gyroscope is reduced or eliminated by the clamped first-order SBS signals.

Example 2 includes the method of Example 1, wherein the optical resonator comprises a ring resonator.

Example 3 includes the method of any of Examples 1-2, wherein: the first pump signal is emitted by a first pump laser device in optical communication with the optical resonator; and the second pump signal is emitted by a second pump laser device in optical communication with the optical resonator.

Example 4 includes the method of Example 3, wherein: an intensity of the first pump signal is modulated at a first frequency by a first intensity controller optically coupled to an output of the first pump laser device; and an intensity of the second pump signal is modulated at a second frequency by a second intensity controller optically coupled to an output of the second pump laser device.

Example 5 includes the method of Example 4, further comprising: transmitting the first pump signal and the CW first-order SBS signal from the optical resonator to a first optical detector; and transmitting the second pump signal and the CCW first-order SBS signal from the optical resonator to a second optical detector.

Example 6 includes the method of Example 5, further comprising: transmitting a first electrical signal measured at the second frequency from the first optical detector to a CCW control loop; and transmitting a second electrical signal measured at the first frequency from the second optical detector to a CW control loop.

Example 7 includes the method of Example 6, wherein the CCW control loop is operative to minimize the first electrical signal by adjusting the second intensity controller to control the DC pump power in the CCW direction.

Example 8 includes the method of any of Examples 6-7, wherein the CW control loop is operative to minimize the second electrical signal by adjusting the first intensity controller to control the DC pump power in the CW direction.

Example 9 includes the method of any of Examples 5-8, wherein: the first optical detector is in optical communication with the optical resonator through a CW transmission port; and the second optical detector is in optical communication with the optical resonator through a CCW transmission port.

Example 10 includes a SBS laser gyroscope, comprising: a first laser device configured to emit a first optical signal in a CW direction; a first intensity controller operative to adjust an intensity of the first optical signal received from the first laser device, and to produce a CW pump signal; a second laser device configured to emit a second optical signal in a CCW direction; a second intensity controller operative to adjust an intensity of the second optical signal received from the second laser device, and to produce a CCW pump signal; an optical resonator in optical communication with the first laser device through the first intensity controller and with the second laser device through the second intensity controller; wherein the CW pump signal is optically coupled into the optical resonator and propagates in the CW direction in the optical resonator; wherein the CCW pump signal is optically coupled into the optical resonator and propagates in the CCW direction in the optical resonator; wherein the CW pump signal generates a CCW first-order SBS signal in the optical resonator that propagates in the CCW direction; wherein the CCW pump signal generates a CW first-order SBS signal in the optical resonator that propagates in the CW direction; wherein the CCW first-order SBS signal generates a CW second-order SBS signal in the optical resonator that propagates in the CW direction; wherein the CW first-order SBS signal generates a CCW second-order SBS signal in the optical resonator and propagates in the CCW direction; a first optical detector in optical communication with the optical resonator, the first optical detector configured to receive the CW pump signal, the CW first-order SBS signal, and the CW second-order SBS signal from the optical resonator; a second optical detector in optical communication with the optical resonator, the second optical detector configured to receive the CCW pump signal, the CCW first-order SBS signal, and the CCW second-order SBS signal from the optical resonator; a CW control loop configured to receive a first electrical beat signal from the first optical detector, which measures a beat signal between the CW pump signal and the CW second-order SBS signal at a given frequency; wherein the CW control loop is operative to stabilize the first electrical beat signal at a set value by adjusting the first intensity controller to control pump power in the CW direction; a CCW control loop configured to receive a second electrical beat signal from the second optical detector, which measures a beat signal between the CCW pump signal and the CCW second-order SBS signal at a given frequency; wherein the CCW control loop is operative to stabilize the second electrical beat signal at a set value by adjusting the second intensity controller to control pump power in the CCW direction; wherein the control loops and intensity controllers are operative to: increase power of the pump signals to above a threshold level such that the CW first-order SBS signal generates the CCW second-order SBS signal in the optical resonator, and the CCW first-order SBS signal generates the CW second-order SBS signal in the optical resonator; wherein above the threshold level, the first-order SBS signals are clamped at substantially the same power level; wherein a Kerr effect bias instability of the SBS laser gyroscope is reduced or eliminated by the clamped first-order SBS signals.

Example 11 includes the SBS laser gyroscope of Example 10, wherein the first and second laser devices are pump lasers.

Example 12 includes the SBS laser gyroscope of any of Examples 10-11, wherein the optical resonator comprises a ring resonator.

Example 13 includes the SBS laser gyroscope of any of Examples 10-12, further comprising: an input bus waveguide optically coupled to the optical resonator at an input coupling region on a first side of the optical resonator; and an output bus waveguide optically coupled to the optical resonator at an output coupling region on an opposing second side of the optical resonator.

Example 14 includes the SBS laser gyroscope of Example 13, wherein: the first optical detector is in optical communication with the optical resonator through a CW transmission port of the output bus waveguide; and the second optical detector is in optical communication with the optical resonator through a CCW transmission port of the output bus waveguide.

Example 15 includes the SBS laser gyroscope of Example 14, further comprising: a rate detector in optical communication with the optical resonator through both the CW transmission port and the CCW transmission port.

Example 16 includes the SBS laser gyroscope of any of Examples 10-15, wherein: the beat signal between the CW pump signal and the CW second-order SBS signal is at a frequency of about 21.6 GHz; and the beat signal between the CCW pump signal and the CCW second-order SBS signal is at a frequency of about 21.6 GHz.

Example 17 includes the SBS laser gyroscope of Example 16, wherein above the threshold level, the copropagating pump signals and the second-order SBS signals generate beat frequencies of about 21.6 GHz.

Example 18 includes a SBS laser gyroscope, comprising: a first input pump laser configured to emit a CW pump signal; a second input pump laser configured to emit a CCW pump signal; a first input pump monitor operative to monitor an intensity of the CW pump signal; a second input pump monitor operative to monitor an intensity of the CCW pump signal; and a ring resonator in optical communication with the first pump laser and the second pump laser, the ring resonator configured to receive the CW pump signal and the CCW pump signal through an input bus waveguide; wherein the ring resonator is in optical communication with a CW transmission port and a CCW transmission port through an output bus waveguide.

Example 19 includes the SBS laser gyroscope of Example 18, wherein: a power level of the CW pump signal is increased to above a threshold level such that a CCW first-order SBS signal generates a CW second-order SBS signal in the ring resonator; the first input pump monitor is operative to maintain the power level of the CW pump signal above the threshold level to generate the CW second-order SBS signal; a power level of the CCW pump signal is increased to above the threshold level such that a CW first-order SBS signal generates a CCW second-order SBS signal in the ring resonator; the second input pump monitor is operative to maintain the power level of the CCW pump signal above the threshold level to generate the CCW second-order SBS signal; above the threshold level, the first-order SBS signals are clamped at substantially the same power level; and a Kerr effect bias instability of the SBS laser gyroscope is reduced or eliminated by the clamped first-order SBS signals.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for reducing or eliminating bias instability in a stimulated Brillouin scattering (SBS) laser gyroscope, the method comprising:
introducing a first pump signal propagating in a clockwise (CW) direction in an optical resonator of the SBS laser gyroscope, the first pump signal emitted by a first pump laser device in optical communication with the optical resonator, wherein an intensity of the first pump signal is modulated at a first frequency by a first intensity controller optically coupled to an output of the first pump laser device;
introducing a second pump signal propagating in a counterclockwise (CCW) direction in the optical resonator, the second pump signal emitted by a second pump laser device in optical communication with the optical resonator, wherein an intensity of the second pump signal is modulated at a second frequency by a second intensity controller optically coupled to an output of the second pump laser device;

generating a CCW first-order SBS signal in the optical resonator that propagates in the CCW direction;

generating a CW first-order SBS signal in the optical resonator that propagates in the CW direction;

increasing a power level of the first pump signal to above a threshold level such that the CW first-order SBS signal generates a CCW second-order SBS signal in the optical resonator; and increasing a power level of the second pump signal to above the threshold level such that the CCW first-order SBS signal generates a CW second-order SBS signal in the optical resonator;

wherein above the threshold level, an intensity fluctuation of the first-order SBS signals disappear and their direct current (DC) power are clamped at substantially the same power level; and wherein a Kerr effect bias instability of the SBS laser gyroscope is reduced or eliminated by the clamped first-order SBS signals.

2. The method of claim 1, wherein the optical resonator comprises a ring resonator.

3. The method of claim 1, further comprising:

transmitting the first pump signal and the CW first-order SBS signal from the optical resonator to a first optical detector; and transmitting the second pump signal and the CCW first-order SBS signal from the optical resonator to a second optical detector.

4. The method of claim 3, further comprising:

transmitting a first electrical signal measured at the second frequency from the first optical detector to a CCW control loop; and transmitting a second electrical signal measured at the first frequency from the second optical detector to a CW control loop.

5. The method of claim 4, wherein the CCW control loop is operative to minimize the first electrical signal by adjusting the second intensity controller to control the DC pump power in the CCW direction.

6. The method of claim 4, wherein the CW control loop is operative to minimize the second electrical signal by adjusting the first intensity controller to control the DC pump power in the CW direction.

7. The method of claim 3, wherein:

the first optical detector is in optical communication with the optical resonator through a CW transmission port; and the second optical detector is in optical communication with the optical resonator through a CCW transmission port.

8. A stimulated Brillouin scattering (SBS) laser gyroscope, comprising:

a first laser device configured to emit a first optical signal in a clockwise (CW) direction;

a first intensity controller operative to adjust an intensity of the first optical signal received from the first laser device, and to produce a CW pump signal;

a second laser device configured to emit a second optical signal in a counterclockwise (CCW) direction;

a second intensity controller operative to adjust an intensity of the second optical signal received from the second laser device, and to produce a CCW pump signal;

an optical resonator in optical communication with the first laser device through the first intensity controller and with the second laser device through the second intensity controller;

wherein the CW pump signal is optically coupled into the optical resonator and propagates in the CW direction in the optical resonator;

wherein the CCW pump signal is optically coupled into the optical resonator and propagates in the CCW direction in the optical resonator;

wherein the CW pump signal generates a CCW first-order SBS signal in the optical resonator that propagates in the CCW direction;

wherein the CCW pump signal generates a CW first-order SBS signal in the optical resonator that propagates in the CW direction;

wherein the CCW first-order SBS signal generates a CW second-order SBS signal in the optical resonator that propagates in the CW direction;

wherein the CW first-order SBS signal generates a CCW second-order SBS signal in the optical resonator and propagates in the CCW direction;

a first optical detector in optical communication with the optical resonator, the first optical detector configured to receive the CW pump signal, the CW first-order SBS signal, and the CW second-order SBS signal from the optical resonator;

a second optical detector in optical communication with the optical resonator, the second optical detector configured to receive the CCW pump signal, the CCW first-order SBS signal, and the CCW second-order SBS signal from the optical resonator;

a CW control loop configured to receive a first electrical beat signal from the first optical detector, which measures a beat signal between the CW pump signal and the CW second-order SBS signal at a given frequency;

wherein the CW control loop is operative to stabilize the first electrical beat signal at a set value by adjusting the first intensity controller to control pump power in the CW direction;

a CCW control loop configured to receive a second electrical beat signal from the second optical detector, which measures a beat signal between the CCW pump signal and the CCW second-order SBS signal at a given frequency;

wherein the CCW control loop is operative to stabilize the second electrical beat signal at a set value by adjusting the second intensity controller to control pump power in the CCW direction;

wherein the control loops and intensity controllers are operative to:

increase power of the pump signals to above a threshold level such that the CW first-order SBS signal generates the CCW second-order SBS signal in the optical resonator, and the CCW first-order SBS signal generates the CW second-order SBS signal in the optical resonator;

wherein above the threshold level, the first-order SBS signals are clamped at substantially the same power level;

wherein a Kerr effect bias instability of the SBS laser gyroscope is reduced or eliminated by the clamped first-order SBS signals.

9. The SBS laser gyroscope of claim 8, wherein the first and second laser devices are pump lasers.

10. The SBS laser gyroscope of claim 8, wherein the optical resonator comprises a ring resonator.

11. The SBS laser gyroscope of claim 8, further comprising:
an input bus waveguide optically coupled to the optical resonator at an input coupling region on a first side of the optical resonator; and
an output bus waveguide optically coupled to the optical resonator at an output coupling region on an opposing second side of the optical resonator.

12. The SBS laser gyroscope of claim 11, wherein:
the first optical detector is in optical communication with the optical resonator through a CW transmission port of the output bus waveguide; and
the second optical detector is in optical communication with the optical resonator through a CCW transmission port of the output bus waveguide.

13. The SBS laser gyroscope of claim 12, further comprising:
a rate detector in optical communication with the optical resonator through both the CW transmission port and the CCW transmission port.

14. The SBS laser gyroscope of claim 8, wherein:
the beat signal between the CW pump signal and the CW second-order SBS signal is at a frequency of about 21.6 GHz; and
the beat signal between the CCW pump signal and the CCW second-order SBS signal is at a frequency of about 21.6 GHz.

15. The SBS laser gyroscope of claim 14, wherein above the threshold level, the copropagating pump signals and the second-order SBS signals generate beat frequencies of about 21.6 GHz.

16. A stimulated Brillouin scattering (SBS) laser gyroscope, comprising:
a first input pump laser configured to emit a clockwise (CW) pump signal;
a second input pump laser configured to emit a counterclockwise (CCW) pump signal;
a first input pump monitor operative to monitor an intensity of the CW pump signal;
a second input pump monitor operative to monitor an intensity of the CCW pump signal; and
a ring resonator in optical communication with the first pump laser and the second pump laser, the ring resonator configured to receive the CW pump signal and the CCW pump signal through an input bus waveguide;
wherein the ring resonator is in optical communication with a CW transmission port and a CCW transmission port through an output bus waveguide;
wherein:
a power level of the CW pump signal is increased to above a threshold level such that a CCW first-order SBS signal generates a CW second-order SBS signal in the ring resonator;
the first input pump monitor is operative to maintain the power level of the CW pump signal above the threshold level to generate the CW second-order SBS signal;
a power level of the CCW pump signal is increased to above the threshold level such that a CW first-order SBS signal generates a CCW second-order SBS signal in the ring resonator; and
the second input pump monitor is operative to maintain the power level of the CCW pump signal above the threshold level to generate the CCW second-order SBS signal;
wherein:
above the threshold level, the first-order SBS signals are clamped at substantially the same power level; and
a Kerr effect bias instability of the SBS laser gyroscope is reduced or eliminated by the clamped first-order SBS signals.

* * * * *